United States Patent [19]

Coldiron

[11] 4,119,002
[45] Oct. 10, 1978

[54] SOD CUTTER

[75] Inventor: Ronnie Hamilton Coldiron, Portland, Tex.

[73] Assignee: Turf-Tech Inc., Corpus Christi, Tex.

[21] Appl. No.: 787,910

[22] Filed: Apr. 15, 1977

[51] Int. Cl.² .......................... B26D 7/06; B26D 4/06
[52] U.S. Cl. ..................................... 83/120; 83/147; 83/408; 83/425.3; 83/430
[58] Field of Search ...................... 83/408, 425.3, 430, 83/106, 120, 147, 164, 166, 119, 157, 165, 109

[56] References Cited

U.S. PATENT DOCUMENTS

| 397,544 | 2/1889 | Gordon et al. ...................... 83/425.3 |
| 1,261,368 | 4/1918 | Dion ........................................ 83/430 |
| 1,878,453 | 9/1932 | Lade ................................... 83/408 X |
| 2,783,041 | 2/1957 | Merritt et al. ...................... 83/106 X |
| 2,889,878 | 6/1959 | White et al. ........................ 83/147 X |

Primary Examiner—Willie G. Abercrombie
Attorney, Agent, or Firm—G. Turner Moller

[57] ABSTRACT

There is provided a device for cutting large blocks of sod into either strips or small blocks suitable for planting. The device includes first and second spaced cutting mechanisms to sever the large sod blocks along lines parallel and transverse to the path of sod movement through the device. With both of the cutting mechanisms operative, small sod blocks are discharged from the machine. In order to discharge sod strips, means are provided to disable one of the cutting mechanisms.

8 Claims, 6 Drawing Figures

SOD CUTTER

This invention relates to machines or devices for cutting large blocks of sod into smaller sod pieces which are ready to plant.

There are a number of techniques which are used to start grass growing around a building, such as an office building, apartment, condominium, or residence, or in open spaces, such as a park of golf course. One such technique is plant grass from seed. The planting of large areas by seeding has steadily declined in use because of the expense and trouble in preparing the seed bed in combination with erosion losses, seed loss and the like. Another technique is to "sprig" the area to be planted which is to transplant one or a few individual living grass stems in a more-or-less predetermined fashion over the area to be planted. This technique is not now widely employed for large areas because of high labor costs involved. Another technique is to plant sod, which is in reality, the transplanting of sizeable pieces of living grass and the dirt or soil which is bound up in the root system of the grass. It is this latter technique to which this invention relates.

As presently practiced, sod is grown in large plots which are called turf farms. When the grass is mature or ready to harvest, machinery is used to strip the sod from the ground and cut it into pieces of a size and shape suitable for handling. Although grass sod can be shipped from a turf farm in coils, it is more customary for the turf farm to ship sod in square blocks, usually 12 × 12 inches or 16 × 16 inches, mounted on a pallet whereby a substantial quantity of sod can readily be shipped by truck without separately loading and unloading each piece.

As presently practiced, there are basically two techniques for planting sod. The first technique is to completely cover the area to be planted with the large sod blocks received from the turf farm. In this technique, the area quickly has a complete grass cover. The cost of installing a complete sod cover is quite high and only unusual situations warrant the expense. More commonly, the area to be planted is spot sodded or plugged. The large sod blocks received from the turf farm are cut into either sod strips or small sod blocks or squares before planting. The sod strips now planted are customarily 4 × 12 inches while the small sod blocks are customarily 4 × 4 inches. In flat areas away from sidwalks and driveways, the small sod blocks are planted in rows with adjacent blocks in the same row being spaced apart a substantial distance. Typical spacings presently used are either 12, 18 or 24 inches from the center of one block to the center of the next block. The blocks in one row are normally staggered with the blocks in an adjacent row. In this fashion, a yard can be soded in a substantially less expensive fashion and yet provide a complete cover within a relatively short time, for example, one growing season. Sod strips are normally utilized immediately adjacent sidewalks or driveways to minimize erosion. In this situation, a single continuous row of sod is laid along the curb, driveway or sidewalk with small sod blocks planted between the sidewalk and curb, for example. In addition, sod strips are utilized in areas having sufficient grade to present an erosion problem. In this situation, a number of continuous rows of sod strips are laid continuously in a direction perpendicular to the slope of the ground on either 12, 18 or 24 inch centers.

At present, substantially all types of grasses are subject to being spot sodded including the St. Augustine family, the Bermuda family including Tifway, Tifgreen 328, Texturf 10, the Zoyzia family, the Kentucky Blue Grass family, and the Rye family. The only requirement for sodding appears to be that the grass has a substantial root network which is capable of carrying soil when stripped from the parent bed.

One of the most onerous tasks involved in spot sodding an area is cutting the large sod blocks received from the turf farm into the smaller blocks or strips which are actually planted. At present, a workman customarily cuts the large sod blocks with a large knife, such as a machete. It will be apparent that cutting sod in this fashion is slow, strenuous and expensive. It is a rule of thumb that one man can cut no more than approximately 100-125 square yards of sod in a day. It is accordingly not surprising that attempts have been made to provide devices for cutting sod into smaller sections as shown in U.S. Pat. Nos. 2,889,878 and 3,159,121. Of these attempts, the device illustrated in U.S. Pat. No. 2,889,878 more nearly resembles the device of this invention but has a number of disadvantages which have apparently prevented it from being commercially acceptable because the device is not now used by landscape contractors nor is it on the market. These disadvantages include the inability to cut either strips or small blocks from a large block, the necessity for manually adjusting a chute in order to accommodate blocks of different thickness, the apparent tendency for sod to become stuck in the chute and not progress in a predicatable fashion through the cutting mechanisms, and the tendency for sod to adhere to the saw blades during a longitudinal cut.

The present invention overcomes the foregoing and other disadvantages of the prior art by providing a novel and improved device for cutting large sod pieces into smaller sections suitable for planting. One feature of this invention resides in the provision of means for delivering either small generally square blocks from the device or generally rectangular strips.

The sod cutting device of this invention comprises a chute through which the large sod pieces are directed toward the cutting mechanism. A plurality of feeder members are positioned to engage the sod in the chute prior to the first cutting mechanism for driving or advancing the large sod pieces toward the first cutting mechanism. The first cutting mechanism includes a plurality of saw-like blades mounted for rotation about a common axis to sever the large sod block into a plurality of strips which extend generally in the direction of the path of sod movement. A plurality of feeder members are preferably mounted on the same shaft with the saw blades to advance the sod material toward a second cutting mechanism.

The second cutting mechanism acts to sever the sod strips transversely of the direction of sod movement to convert each of the sod strips into a plurality of sod blocks. The second cutting mechanism preferably operates on a progressive shearing principal similar to that employed by scissors or the cutting blades of a reel type lawnmower in order to average maximum torque requirements. The sod blocks discharge from the machine through a first discharge chute.

In order to convert the machine to a device for cutting large sod pieces into strips, the second cutting mechanism is disabled. Although the disabling can be accomplished in any suitable manner, as by declutching the second cutting mechanism from its source of power, it is preferred to provide a diverter member which is movable into the path of sod movement to divert the strips away from the second cutting mechanism and into a second discharge chute for transportation out of the machine.

The tendency for sod material, particularly that which includes a wet or gummy soil layer, to adhere to the saw blades and follow the saw blades in their rotary path of movement is overcome by providing a member which strips sod adhering to the blades and directing the stripped sod material into the desired path of movement. In the position of the diverter which allows sod movement toward the second cutting mechanism, the diverter acts as the stripping mechanism. In the diverting position of the diverter, which bypasses sod strips around the second cutting mechanism, a separate stripping member is provided.

It is an object of this invention to provide an improved sod cutting mechine or device which alternatively cuts large sod pieces into small sod blocks or into sod strips.

Other objects and a fuller understanding of the invention may be had be referring to the following description and claims taken in conjunction with the accompanying drawings.

IN THE DRAWINGS

Figure 1:
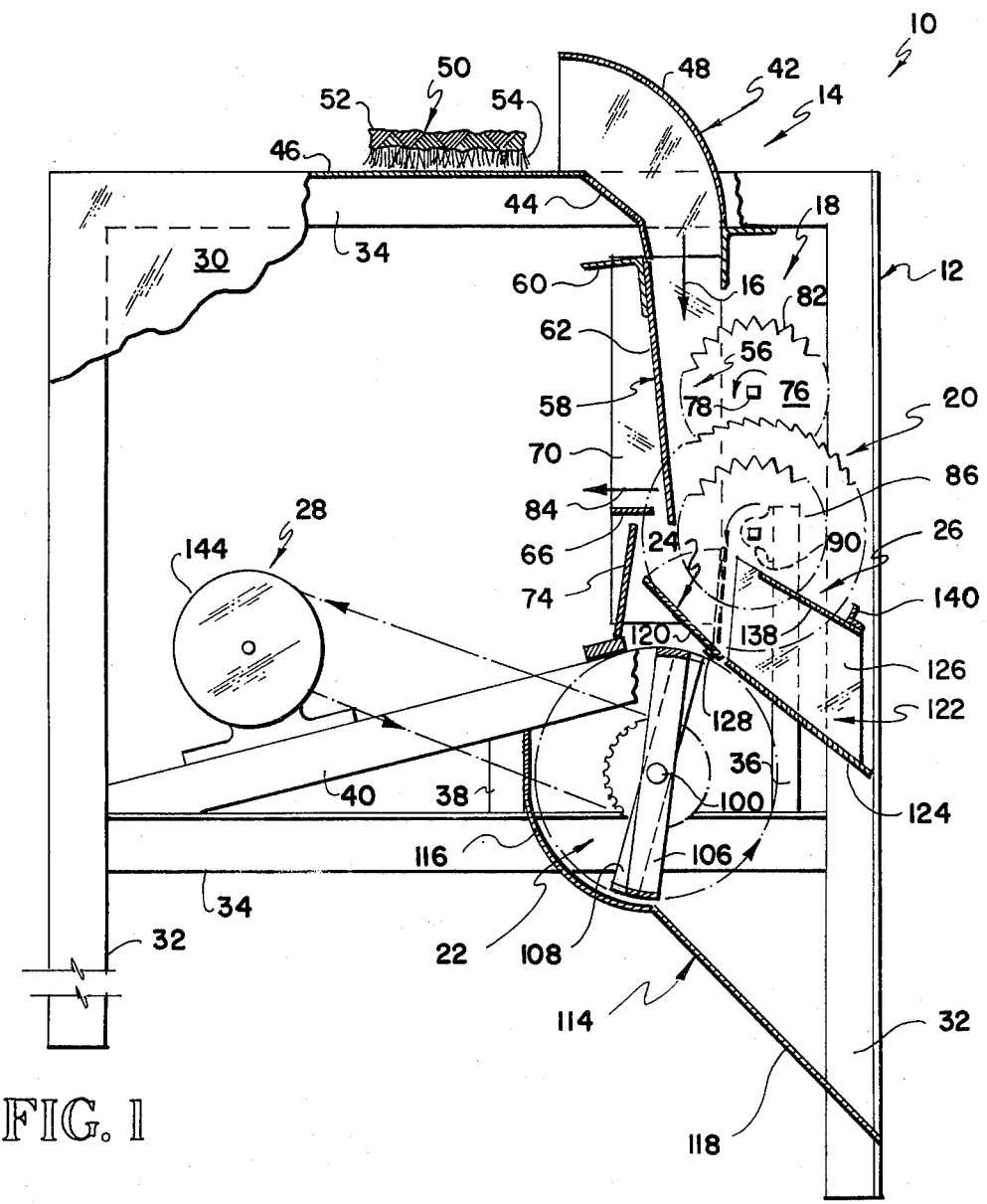
FIG. 1 is a longitudinal cross-sectional view of a sod cutting device made in accordance with the principles of this invention.
Figure 2:
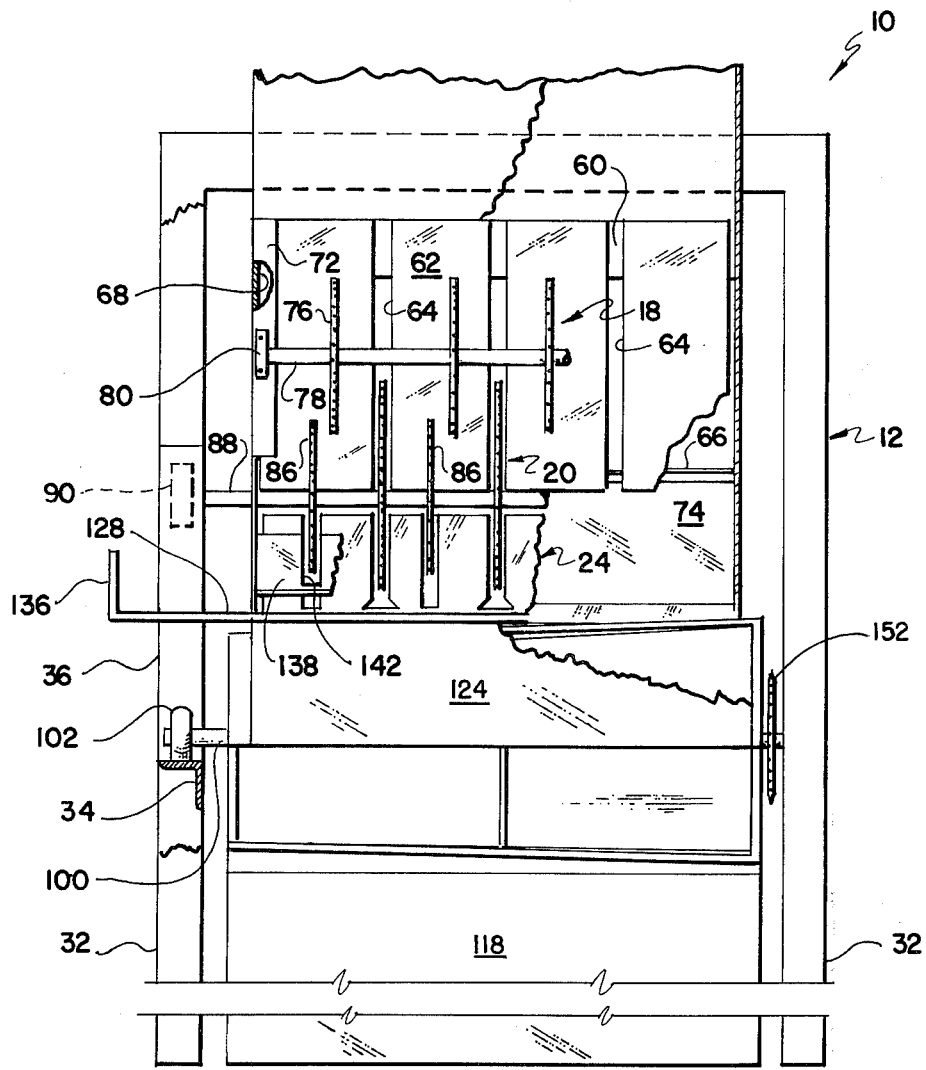
FIG. 2 is a front view of the device of FIG. 1, certain parts being broken away for clarity of illustration.
Figure 6:
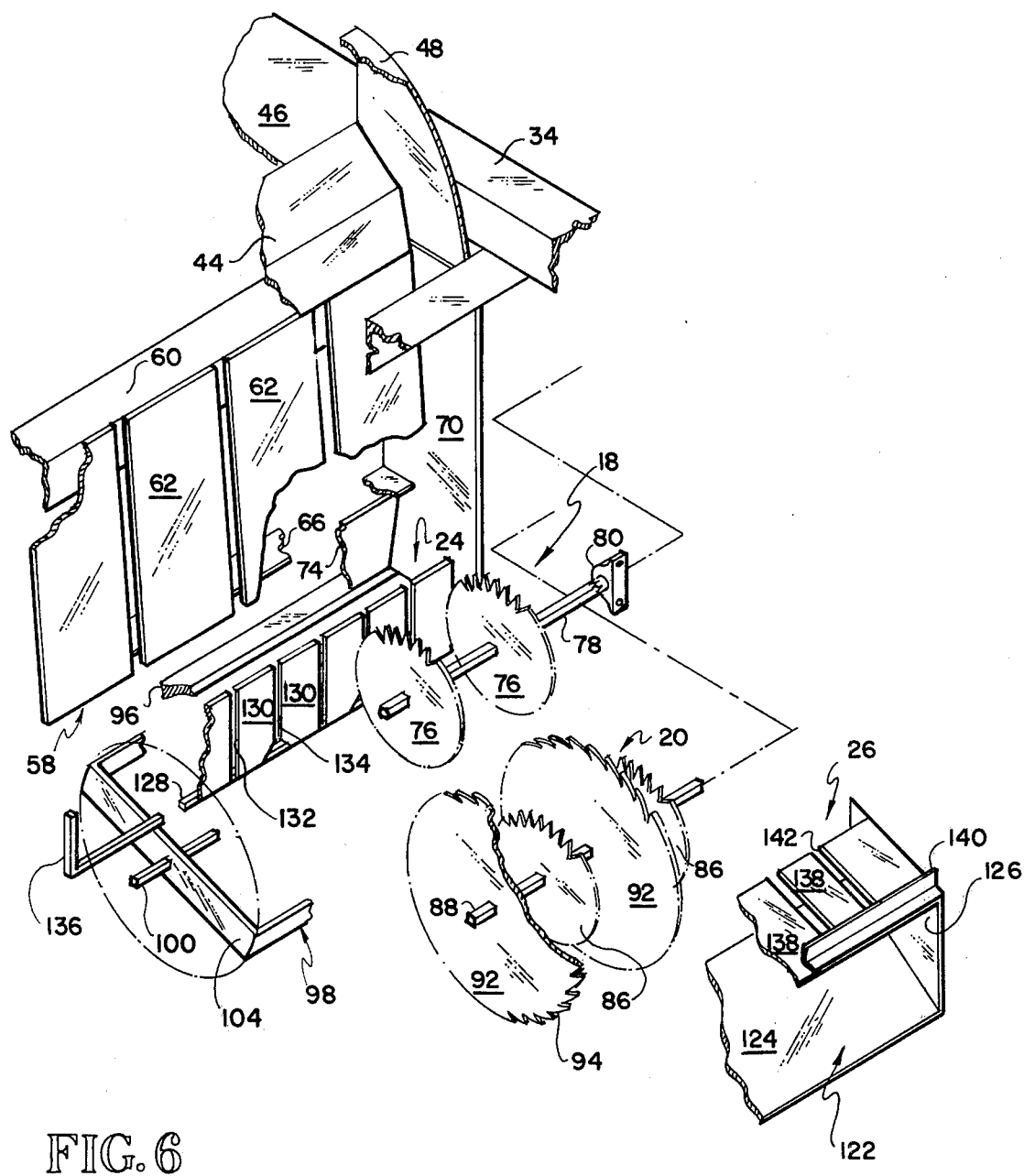
FIG. 6 is an exploded isometric view of part of the sod working mechanisms of the device of FIGS. 1 and 2.

Referring to FIGS. 1, 2 and 6, there is illustrated a device 10 for cutting large blocks of sod into smaller sections which are suitable for planting. The device 10 comprises, as major components, a frame 12, means 14 for receiving and directing large sod blocks in a generally vertical path of sod movement indicated by the arrow 16, means 18 for advancing sod in the path of movement 16, a first cutting mechanism 20 for severing the sod blocks along lines parallel to the path of movement 16 into a plurality of longitudinally extending strips, a second cutting mechanism 22 for severing the sod strips along lines transverse to the path of movement 16 to produce small sod blocks, means 24 for disabling the second cutting mechanism 22 to produce either sod strips or small sod blocks, means 26 for stripping sod from the first cutting mechanism 20, drive means 28 for powering the advancing and cutting mechanism 18, 20, 22 and a sheath or cover 30 enclosing the inner working mechanisms of the device 10 for safety and appearance purposes.

The frame 12 may be of any suitable type and is illustrated as comprising a generally rectangular or square framework having a plurality of generally vertical angle-iron legs 32 welded to or otherwise supporting a plurality of horizontal angle-iron beams 34. A pair of vertical struts 36 provide supports for shaft bearings as shown best in FIG. 3. In addition, the struts 36 partially support, in addition to a pair of small vertical struts 38, a pair of inclined beams 40 for purposes more fully explained hereinafter. For purposes of convenience, the right side of FIG. 1 is termed the front of the device 10 while the left side is termed the rear.

The sod receiving and directing means 14 comprises an inlet chute 42 having an inclined lower wall 44 smoothly registering with a sheet metal top 46 and an upper arcuate wall 48 for engaging the leading edge of a large sod block 50 and directing it into the generally vertical path of sod movement 16. Although the sod block 50 may be inserted into the chute 42 with either the soil layer 52 or the grass layer 54 facing up, it is preferred, under most circumstances, to insert the sod block 50 with the soil layer 52 facing up. As will be more fully apparent hereinafter, this acts to reduce the frictional forces tending to prevent the sod block 50 from moving readily in the path of movement 16.

The receiving and directing means 14 also comprises a chute section 56 having an open front and wholly within the confines of the frame 12. The chute section 56 comprises a rear wall 58 including a transverse beam 60 and a number of wide generally rectangular plates 62 spaced apart to define a number of longitudinally extending slots 64 therebetween as shown best in FIGS. 3 and 6. The lower ends of the plates 62 are free and accordingly are movable between the position illustrated in FIG. 1 and more nearly vertical position abutting a strongback 66 affixed between a pair of sidewalls 68, 70 of the chute section 56. The plates 62 accordingly act as spring members to bias the sod blocks 50 toward the advancing means 18 and toward the first cutting mechanism 20 during passage thereof along the path of sod movement 16. The sidewalls 68, 70 provide a lip 72 for purposes more fully explained hereinafter.

The chute section 56 also includes a plate 74 below the strong-back 66 connected, as by welding or the like, to the sidewalls 68, 70. The plate 74 is offset toward the rear of the device 10 relative to the wall 58 and is rearwardly inclined to the vertical in order to minimize sticking of the sod blocks 50 thereto. Accordingly, as sod strips pass the lower end of the wall 58, the sod strips hang generally vertically in front of the wall 74 and do not cling thereto.

The advancing means 18 acts to force the sod blocks 50 in the path of movement 16 rather than merely relying on gravity and provides important advantages in the operation of the device 10. The device 10 is capable of handling and cutting sod blocks which are wet or which comprise a gummy soil layer 52. The advancing means 18 comprises a plurality of first feeder members 76 mounted on a common shaft 78 above the first cutting mechanism 20. The shaft 78 is mouted in a pair of bearing blocks 80 affixed to the lips 72 carried by the chute section 56. Although the feeder members 76 may be of any desired configuration commensurate with its desired function, the members 76 are conveniently of wheel shape having a plurality of symmetrical teeth 82 on the circumference thereof. The shaft 78 is accordingly mounted to position the circumference of the feeder members 76 forwardly from the wall 58 so that the sod blocks 50 engaged by the teeth 82 are forced against the plates 62 which move in the direction indicated by the arrow 84 to accommodate sod blocks of variable thickness. Because the grass side 54 of the sod blocks 50 is preferably toward the wall 58, it will be apparent that the soil layer 52, which is typically gummier or more difficult to slide, faces the feeder members 76 and does not engage a wall surface thereby minimizing frictional forces retarding movement of the sod blocks 50. As will be explained more fully hereinafter, the shaft 78 is driven in any suitable manner.

The advancing means 18 also comprises a second plurality of feeder members 86 mounted on a shaft 88 supported by a pair of bearing blocks 90 affixed on the vertical struts 36 of the frame 12. As shown best in FIG. 2, the feeder members 86 are transversely offset slightly with respect to the feeder members 74 but longitudinally overlap slightly to assure that the sod block 50 is engaged by at least one row of feeder members throughout its vertical passage past the first and second cutting mechanisms 20, 22.

The first cutting mechanism 20 comprises a plurality of saw-like blades 92, mounted on the shaft 88, extending through the slots 64 in the wall 58 and extending into grooves (not shown) in the strongback 66. As the sod block 50 passes the feeder members 76, the teeth 94 of the blades 92 cut or shear the sod block 50 into a plurality of longitudinally extending sod strips. In one sense, the blades 92 do not act as saw blades because, with sod blocks 50 that include an adherent soil layer, only a small amount of grass or dirt particles, similar to saw dust is produced. It will be apparent, however, that the peripheral speed of the blades 92 exceeds the peripheral speed of the feeder members 76, 86 because of the greater diameter thereof. The shaft 88 is driven in a manner more fully explained hereinafter.

Figures 3, 4:
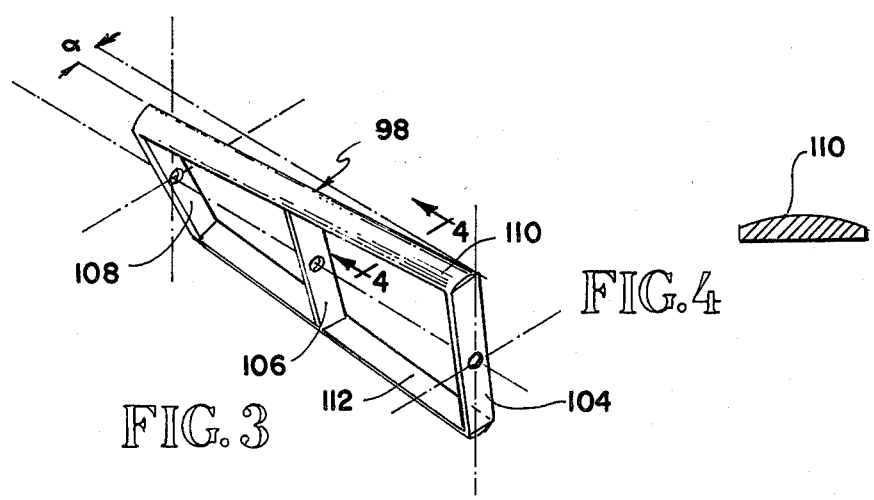
FIG. 3 is an isometric view of the second cutting mechanism of FIGS. 1 and 2.
FIG. 4 is an enlarged cross-sectional view of the cutting mechanism of FIG. 3, taken substantially along line 4—4 as viewed in the direction indicated by the arrows.

The second cutting mechanism 22 comprises a stationary member or anvil 96 affixed to the inclined beams 40 and a rotary cutter member or chopper 98 best illustrated in FIG. 3. The chopper 98 comprises a central shaft 100 mounted by a pair of bearing blocks 102 on the horizontal beams 34 as best shown in FIG. 2. The shaft 100 extends through a plurality of generally radially extending arms 104, 106, 108 that are rotationally offset a small angle α which is selected to assure progressive shearing engagement of a pair of cutting blades 110, 112 with the anvil 96. As shown best in FIG. 4, the radially outer surface of the blades 110, 112 are arcuately curved in the direction of rotation to decrease the areal extent of contact between the blades 110, 112, the sod strips and the anvil 96. The offset angle α may be of any suitable size and, in a production version of the invention, is slightly less than 3°. The chopper 98 may be driven in any suitable fashion, as will be explained more fully hereinafter.

Associated with the second cutting mechanism 22 is an open sided discharge chute 114 comprising a generally cylindrical section 116 affixed between the sides of the device 10 and a generally straight section 118 downwardly inclined from the section 116 to discharge sod blocks exteriorly of the device 10. It will accordingly be apparent that sod cut by the blades 110, 112 is directed forwardly by the cylindrical section 116 onto the inclined chute section 118 for ultimate discharge from the device 10.

Forming an important part of this invention is the means 24 for selectively disabling the second cutting mechanism 22 in order to produce either sod blocks or sod strips. Although the second cutting mechanism 22 may be disabled in any suitable fashion, as by declutching the shaft 100 from its power source, by providing a separate controllable power source for the mechanism 22, or the like, it is preferred that the disabling means 24 comprise a diverter 20 mounted for movement between a diverting position illustrated in solid lines in FIG. 1 for directing the sod strips away from the second cutting mechanism 22 and another or second position. The second position is preferably a non-diverting position illustrated in phantom lines in FIG. 1 and in solid lines in FIG. 6 out of the path of sod movement. In the diverting position, the diverter 120 engages the cut sod strips passing the saw blades 92 and directs the same toward a chute 122 having a downwardly inclined bottom wall 124, a pair of upstanding sidewalls 124 and an open top. The sod strips accordingly travel down the bottom wall 124 out of the device 10. The diverter 120 is best illustrated in FIGS. 2 and 6 and comprises a shaft 128 extending traversely across the device 10 and having a plurality of spaced apart finger members 130 extending, in the non-diverting position, between the blades 92 and feeder members 86. The finger members 130 accordingly define slots 132, 134 therebetween. The slots 134 preferably include an enlarged or belled lower end to avoid buildup of soil or grass resulting from the sod cutting operation. The diverter 120 is moved between the positions illustrated in FIG. 1 by a handle 136 affixed to the shaft 128 which extends beyond the confines of the frame 12. As shown best in FIG. 1, the finger members 128, in the diverting position, are substantially coplanar with the chute bottom wall 124 to prevent any sod strips hanging up on the shaft 128.

In order to prevent sod from adhering to the blades 92 and attempting to follow the rotary path of movement thereof, the stripping means 26 is provided. In the diverting position of the diverter 120, the stripping means 26 includes a plurality of finger members 138 cut from a single plate or welded to a suitable transverse member 140 to provide slots 142 straddling the feeder members 86 and the saw blades 92. From FIG. 1, it will be noted that the angle between the finger members 138 and the rotary path of the saw teeth 94 intersect at an obtuse angle facing generally in the direction of the discharge outlet in order to peel off the sod adhering to the blades 92 and direct the same toward the chute 122.

With the inverter 120 in the non-diverting position, it is evident that the finger members 130 of the diverter 120 act as means to strip sod from the saw blades 92. In the non-diverting position, the finger members 130 intersect the path of movement of the saw teeth 94 at an obtuse angle facing generally in the direction of the second cutting mechanism 22 in order to peel off sod adhering to the blades 92 and direct the same toward the second cutting mechanism 22.

Figure 5:
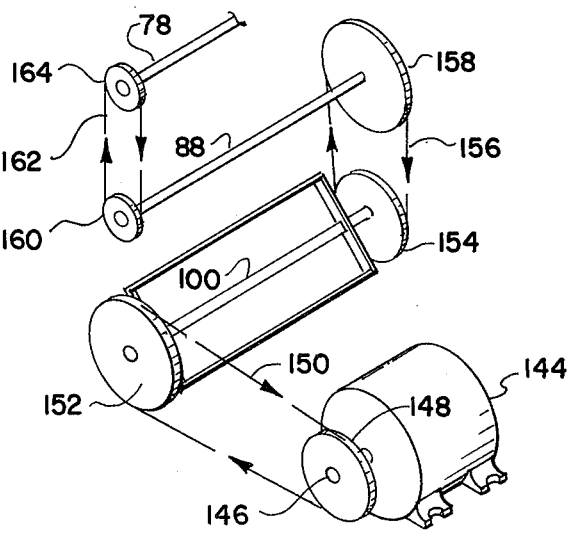
FIG. 5 is a schematic view of the power train of the device of FIGS. 1 and 2.

Referring to FIG. 5, there is illustrated a convenient means for powering the advancing means 18 along with the first and second cutting mechanism 20, 22. A motor-gear reducer combination 144 is mounted at any suitable location, for example on the inclined beams 40, and includes an output shaft 146 having a drive sprocket 148 thereon mounting a drive chain 150. The chain 150 is wrapped around a driven sprocket 152 affixed to the shaft 100 of the chopper 98. A sprocket 154 on the opposite end of the shaft 100 is connected by an endless chain 156 to a driven sprocket 158 on the shaft 88 of the first cutting mechanism 20. A sprocket 160 on the opposite end of the shaft 88 drives an endless chain 162 wrapped around a sprocket 164 on the feeder shaft 78. It is desired that the peripheral speed of the feeder members 76 approximates the peripheral speed of the feeder members 86. Accordingly, when the feeder members are of equal diameter, the shafts 78, 88 are driven at the same rate. Accordingly, the sprockets 160, 162 are of the same size.

In the particular motor-gear reducer combination 144 selected for use in the production version of the invention, the rotational speed of the drive shaft 146 is nominally 30 rpm. Because the peripheral speed of the feeder members 76, 86 controls the rate of sod passage into the second cutting mechanism 22, it is desirable that the peripheral speed of the members 76, 86 be correlated with respect to the cutting rate of the blades 110, 112 in order to achieve a nominal 4 inch long block exiting from the chute 114. The sprockets 148, 150, 154, 158 may accordingly be sized in a manner known in the art.

Although the invention has been described in its preferred form with a certain degree of particularity, it is understood that the present disclosure of the preferred form has been made only by way of example and numerous changes in the details of construction and the combination and arrangement of parts may be resorted to without departing from the spirit and scope of the invention as hereinafter claimed. It is intended that the patent shall cover, by suitable expression in the appended claims, whatever features of patentable novelty exist in the invention disclosed.

I claim:

1. A machine for alternatively cutting large sod pieces into small sod blocks or sod strips, comprising
   means for receiving the large sod pieces and directing the same in a path of sod movement;
   a first cutting mechanism in the path of sod movement for severing the large sod pieces into sod strips including a plurality of blades parallel to the path of movement and means for rotating the blades;
   a second cutting mechanism disposed to receive the strips from the first cutting mechanism for severing the strips into small sod blocks;
   means providing a discharge chute; and
   a diverter comprising a plurality of finger members mounted for movement between a non-diverting position interdigitating with the blades for directing the sod strips toward the second cutting mechanism and a diverting position for directing the sod strips to the discharge chute.

2. The machine of claim 1 wherein the second cutting mechanism comprises a stationary member transverse to the path of movement and substantially linear relative thereto; a moveably mounted member having substantially linear blade mounted for rotation about an axis in the path of movement and providing a radially outer arcuate surface; and means for rotating the moveable member; the blade and the stationary member diverging at a small acute angle to juxtapose along a small area and sequentially juxtaposed at adjacent small areas upon rotation of the moveable member.

3. The machine of claim 1 wherein
   the blade rotating means rotates the blades in a direction toward the diverter finger members in the non-diverting position; and
   means operative in the non-diverting position of the diverter for engaging sod adjacent the blades and stripping sod therefrom, the stripper means comprises the diverter finger members, the angle defined by the path of the blade and the finger members being obtuse.

4. A machine for cutting large sod pieces of generally uniformed predetermined thickness into smaller sod pieces, comprising
   a chute for receiving the large sod pieces and having a generally vertical wall directing the large sod pieces in a generally vertical path of sod movement;
   feeder means, facing the wall on the opposite side of the path of sod movement, for engaging and piercing sod in the chute and advancing the same along the path of movement including a plurality of toothed wheels and means driveably mounting the toothed wheels for rotation in the path of movement, the circumference of the toothed wheels being spaced from the vertical wall less than the thickness of the sod pieces;
   the wall comprising a plurality of spring memebers, spaced apart to define slots parallel to the path of sod movement, juxtaposed to the feeder means and moveable away therefrom, the spring members comprising means biasing sod passing along the path of sod movement toward the feeder means;
   a first cutting mechanism in the path of sod movement for cutting the large sod pieces along lines parallel to the path of movement into sod strips, including a plurality of blades, each of the blades extending through one of the slots defined by the spring members, shaft means mounting the blade for rotation and means for rotating the shaft means; and
   a second cutting mechanism disposed to receive sod strips from the first cutting mechanism for severing the strips into smaller sod pieces.

5. The machine of claim 4 wherein the feeder means includes a second plurality of toothed wheels and means drivably mounting the second toothed wheels for rotation in the path of movement, the circumference of the second tooth wheel being spaced from the vertical wall less than the thickness of the sod pieces for engaging, piercing and advancing the sod during a second portion of sod travel in the path of movement, the first mentioned toothed wheels engaging, piercing and advancing sod during a first portion of sod travel in the path of movement, the first and second portions being overlaped.

6. A machine for cutting large sod pieces into smaller sod pieces, comprising
   a chute for receiving the large sod pieces and directing the same in a generally vertical path of sod movement;
   feeder means for engaging sod in the chute and advancing the same along the path of movement;
   a first cutting mechanism in the path of sod movement for cutting the large sod pieces along a line parallel to the path of movement into sod strips including a plurality of blades parallel to the path of movement and means for rotating the blades;
   a second cutting mechanism disposed to receive sod strips from the first cutting mechanism for severing the strips into smaller sod pieces;
   means providing a discharge chute; and
   a diverter mounted for movement between a non-diverting position stripping the sod strips off of the blades and directing the sod strips toward the second cutting mechanism and a diverting position for directing the sod strips to the discharge chute.

7. The machine of claim 6 further comprising a cabinet enclosing the feeder means, the first and second cutting mechanisms and the diverter; means pivotally mounting the diverter for movement about an axis between the diverting and non-diverting positions including a shaft coaxial with the axis, the shaft extending through the cabinet and having a handle carried thereby exterior of the cabinet.

8. A machine for alternatively cutting large sod pieces into small sod blocks or sod strips, comprising
- means for receiving the large sod pieces and directing the same in a path of sod movement;
- a first cutting mechanism for severing the large sod pieces into sod strips;
- a second cutting mechanism disposed to receive the strips from the first cutting mechanism for severing the strips into small sod blocks;
- means providing a discharge chute;
- a diverter mounted for movement between a non-diverting position for directing the sod strips toward the second cutting mechanism and a diverting position for directing the sod strips to the dishcarge chute; and
- means for stripping the sod from the first cutting mechanism when the diverter is in the non-diverting position and means for stripping sod from the first cutting mechanism when the diverter is in the diverting position.

* * * * *